US009984684B1

(12) United States Patent
Uszkoreit et al.

(10) Patent No.: US 9,984,684 B1
(45) Date of Patent: May 29, 2018

(54) INDUCING COMMAND INPUTS FROM HIGH PRECISION AND HIGH RECALL DATA

(71) Applicant: Google LLC, Mountain View, CA (US)

(72) Inventors: Jakob D. Uszkoreit, San Francisco, CA (US); John Blitzer, Mountain View, CA (US); Engin Cinar Sahin, New York, NY (US); Rahul Gupta, Mountain View, CA (US); Dekang Lin, Cupertino, CA (US); Fernando Pereira, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 803 days.

(21) Appl. No.: 13/926,844

(22) Filed: Jun. 25, 2013

(51) Int. Cl.
  *G06F 17/30* (2006.01)
  *G10L 15/18* (2013.01)
  *G06F 17/27* (2006.01)

(52) U.S. Cl.
  CPC ...... *G10L 15/1822* (2013.01); *G06F 17/2705* (2013.01); *G06F 17/30654* (2013.01); *G06F 17/30864* (2013.01)

(58) Field of Classification Search
  None
  See application file for complete search history.

(56) References Cited

U.S. PATENT DOCUMENTS

| 5,212,821 | A | 5/1993 | Gorin et al. |
| 5,797,123 | A | 8/1998 | Chou et al. |
| 6,745,178 | B1 * | 6/2004 | Emens et al. ............... 707/741 |
| 6,782,377 | B2 * | 8/2004 | Agarwal et al. ............... 706/47 |
| 7,454,430 | B1 * | 11/2008 | Komissarchik et al. |
| 7,904,440 | B2 * | 3/2011 | Anderson et al. ........... 707/706 |
| 8,086,600 | B2 * | 12/2011 | Bailey ............... G06F 17/30864 707/706 |
| 8,296,309 | B2 * | 10/2012 | Brassil ............. G06F 17/30699 704/251 |
| 8,346,791 | B1 * | 1/2013 | Shukla ............. G06F 17/30864 707/759 |

(Continued)

FOREIGN PATENT DOCUMENTS

| EP | 0268367 A2 * | 5/1988 | ....... G06F 17/30392 |
| EP | 834862 A2 | 4/1998 | |
| WO | WO2000014727 A1 | 3/2000 | |

OTHER PUBLICATIONS

The Ohio State University, Department of Computer Science and Engineering http://web.cse.ohio-state.edu/software/2231/web-sw2/extras/slides/27.Recursive-Descent-Parsing.pdf.*

(Continued)

*Primary Examiner* — Aleksandr Kerzhner
*Assistant Examiner* — Eddy Cheung
(74) *Attorney, Agent, or Firm* — Fish & Richardson P.C.

(57) ABSTRACT

A language processing system collects similar queries and respective responses and aggregated by responses. Incorrect responses are determined and filtered by the aggregation. The remaining responses are then used to query a high precision system for attributes of entities specified by the queries. The attribute type is determined from the responses of the high precision system, and corresponding parse rules are generated. The parse rules are then associated with an operation that yields a response that specifies an attribute of the attribute type.

15 Claims, 4 Drawing Sheets

(56) References Cited

U.S. PATENT DOCUMENTS

| | | | |
|---|---|---|---|
| 2004/0260692 A1* | 12/2004 | Brill | G06F 17/3069 |
| 2005/0044076 A1* | 2/2005 | Wu | G06F 17/30867 |
| 2005/0086049 A1* | 4/2005 | Bennett | G06F 17/27 704/4 |
| 2006/0190261 A1 | 8/2006 | Wang | |
| 2007/0198481 A1* | 8/2007 | Hogue | G06F 17/30572 |
| 2009/0240568 A1* | 9/2009 | Ramer et al. | 705/10 |
| 2010/0228714 A1* | 9/2010 | Carroll | 707/706 |
| 2010/0306206 A1* | 12/2010 | Brassil | G06F 17/30699 707/754 |
| 2012/0290509 A1 | 11/2012 | Heck et al. | |
| 2013/0060757 A1* | 3/2013 | Myslinski | G06Q 30/02 707/722 |

OTHER PUBLICATIONS

Bonino et al., "Dynamic Optimization of Semantic Annotation Relevance" in Evolutionary Computation CEC2004, Congress on Evolutionary Computation, 2004, pp. 1301-1308.

Chen et al., "Diverse Topic Phrase Extraction from Text Collection" WWW 2006, 9 pages.

Gorin et al., "An Experiment in Spoken Language Acquisition", IEEE Transactions on Speech and Audio Processing, 2 (1)(11), 1994, pp. 224-240.

Gupta et al., "Segmenting Spoken Language Utterances Into Clauses for Semantic Classification" in Automatic Speech Recognition and Understanding (ASRU 2003), 2003 IEEE Workshop, pp. 525-530.

Kawahara et al., "Topic Independent Language Model for Key-Phrase Detection and Verification", Acoustics, Speech, and Signal Processing, 1999, 1999 IEEE International Conference, pp. 685-688.

Krulwich et al., "Learning user information interests through the extraction of semantically significant phrases" AAAI Technology Report SS-96-05, Compilation, pp. 110-112.

Lee et al., "Utterance-Level Latent Topic Transition Modeling for Spoken Documents and its Application in Automatic Summarization" in Acoustics, Speech and Signal Processing (ICASSP), 2012 IEEE International Conference, 2012, pp. 5065-5068. [online] [Retrieved on Jan. 31, 2013], Retrieved from the internet: http://www.cs.cmu.edu/~yvchen/doc/ICASSP12_LTModel.pdf.

Lehuen et al., "A Robust Semantic Parser Designed for Spoken Dialog Systems" in 2010 IEEE Fourth International Conference on Semantic Computing (ICSC), 2010, pp. 52-55.

Tur et al., "Semi-Supervised Learning for Spoken Language Understanding Using Semantic Role Labeling" in Automatic Speech Recognition and Understanding (ASRU 2005), pp. 232-237. [online] [Retrieved on Jan. 31, 2013], Retrieved from the internet: http://www.cs.cmu.edu/~ananlada/SemanticRoleLabelingASRU05.pdf.

Wong et al., "Improvements on a Semi-Automatic Grammar Induction Framework" in IEEE Automatic Speech Recognition and Understanding Workshop, 2001, pp. 288-291. [online] [Retrieved on Jan. 31, 2013], Retrieved from the internet: http://www1.se.cuhk.edu.hk/~hccl/publications/pub/Meng_ASRU2001_NLU.pdf.

Wu et al., "KIP: A Keyphrase Identification Program with Learning Functions" in Proceedings of the International Conference on Information Technology: Coding and Computing (ITCC'04), vol. 2, 5 pages.

Yaman et al., "An Integrative and Discriminative Technique for Spoken Utterance Classification" IEEE Transactions on Audio, Speech, and Language Processing, 16(6), 2008, pp. 1207-1214. [online] [Retrieved on Jan. 31, 2013], Retrieved from the internet: http://www1.icsi.berkeley.edu/~sibel/TASL-SUC.pdf.

\* cited by examiner

INDUCING COMMAND INPUTS FROM HIGH PRECISION AND HIGH RECALL DATA

BACKGROUND

This specification relates to language processing systems.

Speech recognition and speech processing systems are prevalent in many consumer electronic devices. Many of these electronic devices now utilize speech command processing techniques to invoke and perform particular operations. For example, a user device, such as a smart phone, or a server in communication with a user device, can process speech commands to perform specified operations that include searching the web, querying a flight database, and so on.

A system, such as a user device or a server in data communication with the user device, uses a speech recognition processing system to recognize and process speech commands. A provider of the speech recognition and processing system develops parsing rules for various commands a user will speak. Upon a successful parse of a command input by a rule, an action associated with the rule is performed (or may be performed subject to user confirmation). Users, however, can articulate commands for a particular action in many different ways. Thus, the provider of the speech recognition and processing system cannot anticipate beforehand all possible commands that will be received, and thus cannot generate all possible parsing rules beforehand. Accordingly, some commands may not parse for a particular action, or may parse to an action that is different from what the user intends.

SUMMARY

In general, one innovative aspect of the subject matter described in this specification can be embodied in methods that include the actions of selecting a group of queries and corresponding responses, each corresponding response having been served by a first service having a first recall and a first precision, and each query in the group of queries referencing an entity of a first entity type and that meet a similarity threshold that measure a similarity of the query to other queries in the group; determining, from the queries, a first proper subset of the queries, each query in the first proper subset of queries referencing a first entity of the first entity type and each corresponding response for the query being a first response type; querying a second service for the first entity referenced in the first proper subset of queries for an attribute value matching the corresponding response, wherein the second service has a second recall less than the first recall and a second precision greater than the first precision; and determining, from the response of the second service, an attribute of the response type. Other embodiments of this aspect include corresponding systems, apparatus, and computer programs, configured to perform the actions of the methods, encoded on computer storage devices.

In general, one innovative aspect of the subject matter described in this specification can be embodied in methods that include the actions of selecting a group of queries and corresponding responses, each corresponding response having been served by a first service having a first recall and a first precision, and each query in the group of queries referencing an entity of a first entity type and that meet a similarity threshold that measure a similarity of the query to other queries in the group; determining, from the queries, a first proper subset of the queries, each query in the first proper subset of queries referencing a first entity of the first entity type and each corresponding response for the query being a first response type; querying a second service for the first entity referenced in the first proper subset of queries for an attribute value matching the corresponding response, wherein the second service has a second recall less than the first recall and a second precision greater than the first precision; and determining, from the response of the second service, an attribute of the response type. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The system identifies command inputs from log data, such as queries, that share a common structure and for which are provided similar response types of an unknown attribute type. The responses are processed by a high precision system to determine the attribute type. These command inputs may then be processed and associated with a particular action that yields a response of the attribute type. Thus, by utilizing crowdsourcing techniques from log data, parse rules for command inputs that occur frequently are generated. Accordingly, new parses for particular action emerge without requiring detailed studies of commands, or generation of additional command inputs by evaluators. This reduces the overall parse model maintenance costs and maintenance time.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A language processing system collects similar queries and respective responses and aggregated by responses. Incorrect responses are determined and filtered by the aggregation. The remaining responses are then used to query a high precision system for attributes of entities specified by the queries. The attribute type is determined from the responses of the high precision system, and corresponding parse rules are generated. The parse rules are then associated with an operation that yields a response that specifies an attribute of the attribute type.

Figure 1:
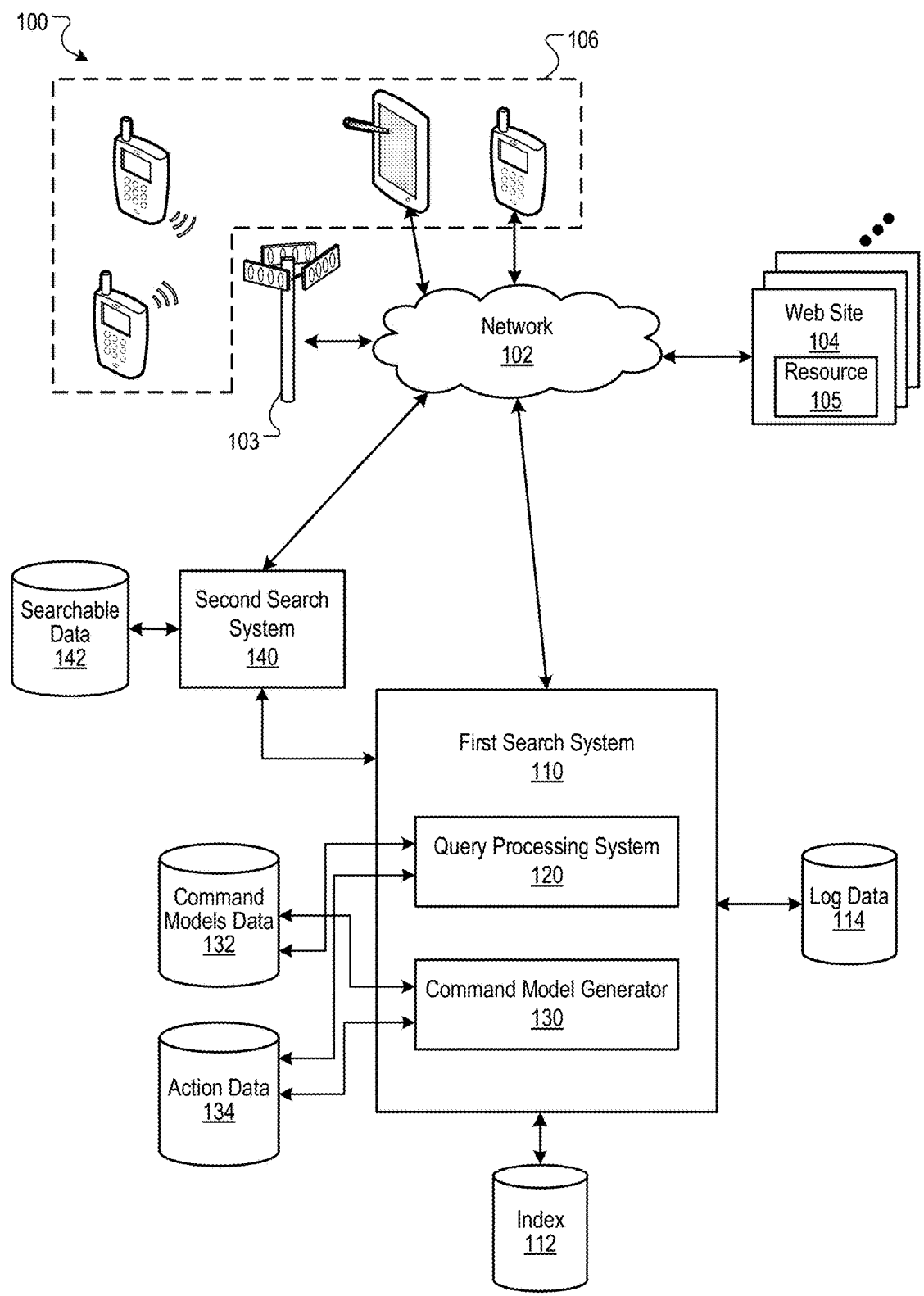
FIG. 1 is a block diagram of an environment in which log data are processed to induce command inputs from a high precision system.

FIG. 1 is a block diagram of an environment 100 in which log data are processed to induce command inputs from a high precision system. A computer network 102, such as a local area network (LAN), wide area network (WAN), the Internet, or a combination thereof, provides for data communication between electronic devices and systems. Examples of such electronic device and systems include websites 104 and user devices 106. The computer network 102 may also be included, or be in data communication with, one or more wireless networks 103.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104. A resource 105 is any data that can be provided by the website 104 over the network 102 and that is associated with a resource address.

In addition to providing content, particular websites 104 may also provide one or more services. Example services include a search service provided by a search engine, video serving provided by video hosting servers, a mapping service providing by a map server, and so on.

A user device 106 is an electronic device that is capable of requesting and receiving resources over the network 102, establishing communication channels, e.g., voice communications, with other user devices 106, and also capable of performing other actions. Example user devices 106 include personal computers, mobile communication devices, and other devices that can send and receive data over the network 102. The user devices 106 may communicate over the networks 102 and 103 by means of wired and wireless connections.

To facilitate searching of these resources 105, the first search system 110 identifies the resources by crawling the publisher websites 104 and indexing the resources provided by the publisher websites 104. The resources are indexed and the index data are stored in an index 112. Although the index 112 is depicted as a single entity, it can include multiple parts and different indexes. Furthermore, as described above, multiple corpora each of a different content type, can be indexed.

The user devices 106 submit search queries to the first search system 110 for processing by query processing system 120. The search queries are submitted in the form of a search request that includes the search request and, optionally, a unique identifier that identifies the user device 106 that submits the request. The unique identifier can be data from a cookie stored at the user device, or a user account identifier if the user maintains an account with the first search system 110, or some other identifier that identifies the user device 106 or the user using the user device.

In response to the search request, the first search system 110 uses the index 112 to identify resources that are relevant to the queries. The first search system 110 identifies the resources in the form of search results and returns the search results to the user devices 106 in search results page resource. A search result is data generated by the first search system 110 that identifies a resource or provides information that satisfies a particular search query, which is a command input for the first search system 110.

The search results are ranked based on scores related to the resources identified by the search results. The scores can differ based on the corpus searched. For example, for a web corpus, the scores can be based on information retrieval ("IR") scores, and optionally a separate ranking of each resource relative to other resources (e.g., an authority score). For an image search, the scores can be based on a selection rate of the image and the relevance of label terms to the query. Other scoring schemes are used for other corpora. The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the command inputs of user devices 106 are stored in log data 114. The log data 114 stores data defining device sessions, command inputs received during the sessions, and actions taken in response to the command inputs. As used in this description, a device session, or simply a session, is defined by one or more command inputs that are received and grouped together to indicate they occurred during a session. The session can be defined by a variety of appropriate ways. For example, a session may be a set of command inputs received during a predefined time period, e.g., 30 minutes; or may be up to N inputs, e.g., up to 50 inputs; or may be a period during which a user maintained interactions with the user device until an inactivity time out (e.g., five minutes) occurred. Other appropriate criteria to define a session can also be used.

For each command input, the log data 114 also stores data describing actions taken in response to the command input. The data describing actions taken in response to the command input can be, for example, data describing service requests and parameters passed to the service; and actions taken at the user device, such as the selection of search results; etc. Furthermore, some of the command inputs may not directly result in action performed by the user device. This may be the result of a command input not being parsed by rule associated with an action, or being parsed by a rule associated with an action that is not an action the user desires, or for some other reason.

As used in this specification, "command input" or "command input sentence" can be an input sentence, a query, or any other input that has one or more terms. The input does not need to be a grammatically correct and complete sentence, e.g., it need not have both a predicate and a subject. For example, the following input would constitute a command input, but would not constitute a grammatically complete sentence: "Images of lions." A command input need not have an associated parsing rule, nor have annotations or other data describing terms of the command input. The language processing system, in some implementations, can process command inputs to generate a parsing rule and provide such annotations. In general, any input of one or more terms can be a command input, regardless of whether the particular command input is associated with other language processing data, such as parsing rules, parts of speech tagging, etc.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In some implementations, the first search system 110 (and/or the user device 106, if so equipped) may be able to perform language processing on received queries. The results of the language processing are associated with particular actions. For example, a query, which may be interpreted as a potential command input that may invoke a particular action, may be parsed by parsing rules stored in command models data 132. The command models data 132 associates actions with corresponding command models by use of parsing rules, such as grammars. The command models data 132 store command models for actions specified by action data 134, and are generated by the command model generator 130.

The first search system 110 may interpret every received query as a command input, and depending on the parsing result, may perform a web search, and also perform an additional operation (or cause another system to perform the additional operation and provide the resulting information to the first search system 110, which then, in turn, provides the resulting information with the search results), or may only perform the additional operation in lieu of a search operation.

Other search systems may also be available, such as the second search system 140. The second search system 140 may store searchable data 142 that includes some of the information stored in the index 112. The stored information in the searchable data 142 may be a proper subset of the data in the index 112, or may be partially overlapping with the information stored in the index 112. The second search system 140 is characterized in that it is a high precision system relative to the first search system 110. In other words, the precision of the second search system 140 is higher than the precision of the first search system 110. Similarly, the recall of the second search system 140 may be lower than the recall of the first search system 110.

The searchable data 142 and the second search system 140 can be any appropriate system and data that facilitates a high precision response to a query. For example, the second search system 140 can be a relational database, and the searchable data 142 can be data stored according to a relational database schema.

Figure 2A:
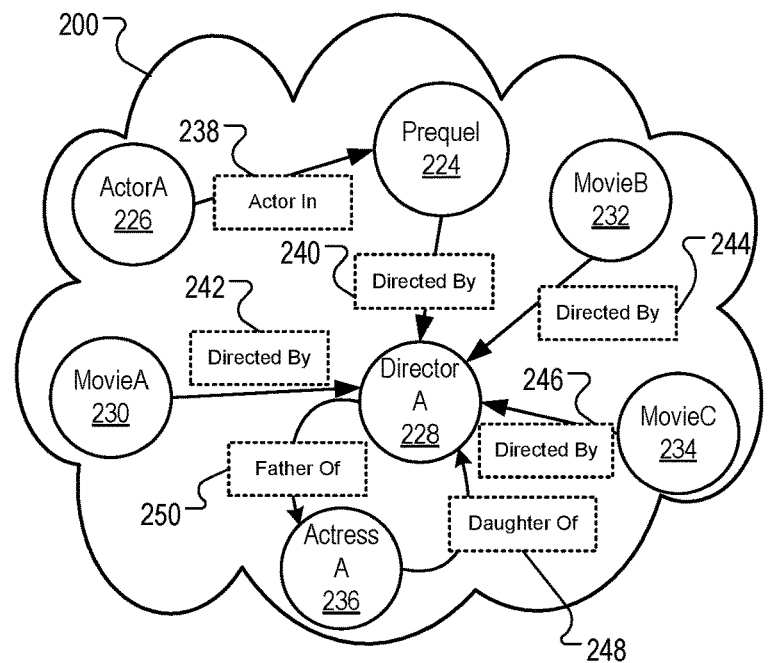
FIG. 2A is an example illustration of a graph structure for a high precision system.

In another implementation, the searchable data 142 can be a knowledge graph based data structure that defines tuple of the form <entity, attribute type, attribute value>, where the entity defines an instance of an entity, such as a person, place, or thing; the attribute type defines a type of attribute that describes the entity, such as gender, height, or age; and the attribute value is a value of the attribute type, such as Female, 5'7", and 37. One example implementation of such a knowledge graph is depicted in FIG. 2A. The knowledge graph 200 identifies relationships between the entities, and uses these relationships to facilitate identification of one or more additional entities for the particular entity. As used in this document, a knowledge graph is a representation of relationships between unique entities, and the knowledge graph can be stored in one or more data stores. Each node in the knowledge graph represents a different entity and pairs of nodes in the knowledge graph are connected by relationship paths (e.g., graph edges) that indicate a relationship between the two entities represented by the pair of nodes.

For example, a portion of knowledge graph 200 of FIG. 2A relates to the subject of entertainment, and includes node 224 representing the prequel, node 226 representing ActorA, node 228 representing DirectorA, nodes 230, 232, and 234 that respectively represent MovieA, MovieB, and MovieC, and node 236 representing ActressA. Node 224 and node 226 are connected by a relationship path 238 indicating that ActorA is an actor in the prequel. Node 228, representing DirectorA, is connected to each of node 224, 230, 232, 234, and 236 by relationship paths 240, 242, 244, and 246 indicating that DirectorA is the director of each of the prequel, MovieA, MovieB, and MovieC.

A single pair of nodes can have multiple different relationship paths that connect the pair of nodes. For example, node 236, which represents ActressA, is connected to node 228, which represents DirectorA, by relationship path 248 indicating that ActressA is the daughter of DirectorA, and by relationship path 250 indicating that DirectorA is the father of ActressA. If additional relationships were identified between DirectorA and ActressA additional relationship paths could be used to represent these relationships.

Users most often use the first search system 110, however, when searching for information, as the first search system 110 can readily process an unstructured query input. Because the first search system 110 has a lower precision and higher recall than the second search system 140, the first search system 110 provides many more responses than the second search system 140. However, query patterns and responses determined from the logs data 114 of the first search system 110 can be used in concert with the second search system 140 to determine a most likely informational need for a query. If a likely informational need emerges, and the query is not interpreted as a command input, then a parsing rule can be generated for the query structure. The parsing rule is associated with an action that will yield the information that satisfies the determined informational need. For example, the action may be a query of the second search system 140, or otherwise provide the information that satisfies the determined informational need, and the action is performed when a query received at the first search system 110 is successfully parsed by the parsing rule.

Figure 2B:
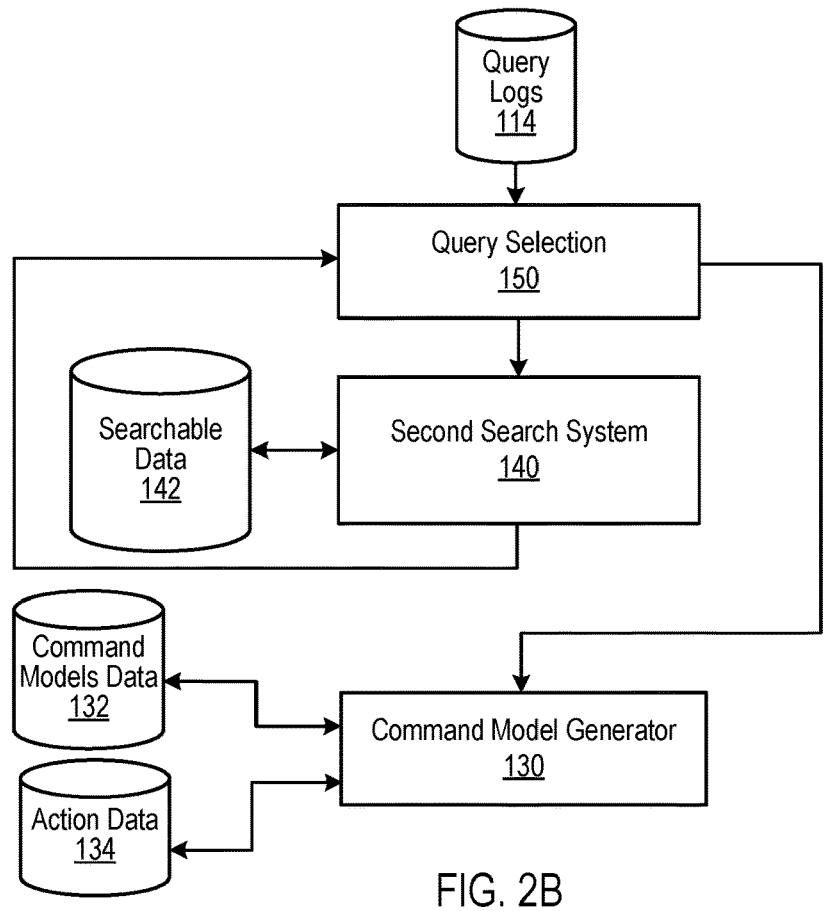
FIG. 2B is a system flow diagram for inducing command inputs.
Figure 3:
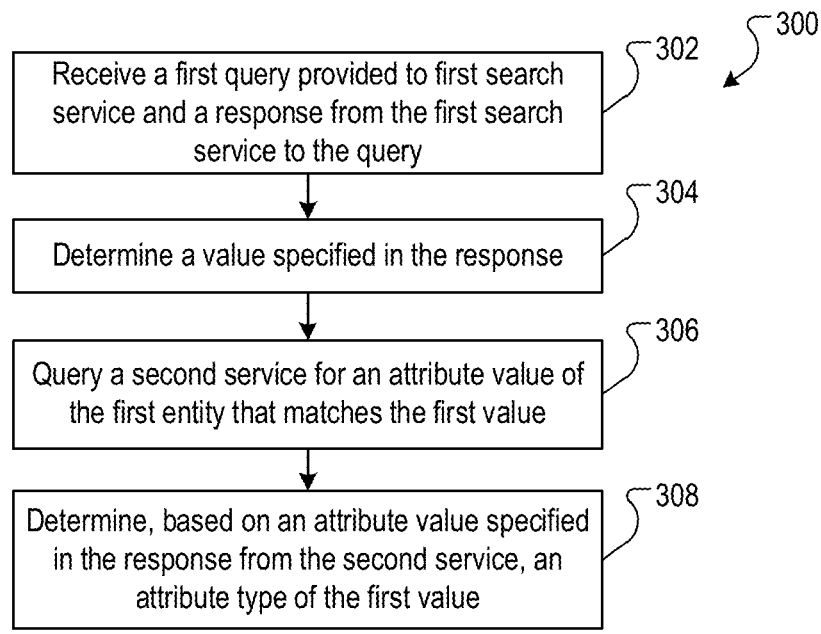
FIG. 3 is a flow diagram of an example process for selecting a query from which a parse rule for a command input may be induced.

Identification of such queries, and inducing command inputs from these queries, is described with reference to FIG. 2B, which is a system flow diagram for inducing command inputs, and FIG. 3, which is a flow diagram of an example process 300 of selecting a query from which a parse rule for a command input may be induced.

While the process 300 is described with reference to FIG. 2B, implementation of the process 300 is not limited to the example functional distribution shown in FIG. 2B, and other architectures and functional distributions can also be used. In general, the process 300 processes a query that specifies a particular entity and which has a response from the first search system 110 that specifies an attribute value. The attribute value and the entity of the first query are used to query the second search system 140 to determine an attribute type. After the attribute type is determined, additional queries that are similar to the first query are selected, and the attribute type is verified. Upon verification, a parsing rule based on the query structures and attribute type is generated, and associated with an action that, when executed, provides the attribute value of the attribute type specific to an entity. Thereafter, when a new query is successfully parsed by the parsing rule, the entity specified by the query will be identified, and the attribute value will be returned.

The process 300 receives a first query provided to first search service and a response from the first search service to the query (302). For example, a query selection process 150 selects a first query from the logs data 114. If the responses to the queries are stored in the logs data 114, the selection process receives the responses. Otherwise, the selection process can submit the first query to the first search system 110 and receive responses. The selection process selects a first query that references a first entity, such as the query [How tall is Ima Starr], where "Ima Starr" is the name of a famous actress. The query selection process 150 can implement appropriate semantic analysis and entity detection algorithms to determine entities specified in the queries.

The process 300 determines a value specified in the response (304). For example, the selection process 150 determines, from search results, whether the search results specify a first value. For example, the search results may include results that reference web pages, images, and discrete units of information. The latter are specific attribute values, the type of which may not be clearly identified. For example, for the query [How tall is Ima Starr], multiple search results may be received, results for images and web page articles. One of the results may be a discrete value, e.g., 5' 7". In this example, the value of 5' 7" is determined to be the value.

Sometimes a search result may include multiple discrete values. For example, because "Ima Starr" is a famous person, the first search system 110 may provide a search result that lists several attribute values of her, such as her date of birth, age and height. Each of these attribute values may be selected, and the process 300 can include a selection filtering process to select one of the attribute values for verification. The filtering process is described in more detail below.

The process 300 queries a second service for an attribute value of the first entity that matches the first value (306). For example, for the query [How tall is Ima Starr] and the response 5' 7", the query selection process 150 queries the second search system 140 for an attribute value for the detected entity "Ima Starr" that matches 5' 7".

The process determines, based on an attribute value specified in the response from the second service, an attribute type of the first value (308). For example, the query selection process 150 receives, in response to the query for an attribute value for the detected entity "Ima Starr" that matches 5' 7", attribute data specifying that the value of 5' 7" matches the "height" value of the attribute type "height" for the entity "Ima Starr."

In the situation where multiple attributes values are selected as first values, the query selection process 150 can implement appropriate heuristics to determine which attribute value most likely correctly corresponds to the first query. For example, assume that one result listed values for the person's date of birth, age and height. Each of these attribute values are used to query the second search system 140, and the corresponding attribute data specify the attribute types of birth date, age, and height. The query selection process 150 performs a semantic analysis on the query text [How tall is Ima Starr] to determine which, if any, of the attribute types correctly corresponds to the query text. Any appropriate semantic analysis algorithms can be used for this process. In this example, the semantic yield of the query text would indicate a request for "height" for a "person." Because the attribute type "height" is most closely aligned with the determined semantic meaning, of the query, the attribute type of "height" is selected.

In some implementations, a parsing rule can be generated for the query [How tall is Ima Starr]. In some implementations, however, the determination of an attribute type for a particular query structure is verified by analyzing additional queries that match the query structure of the first query. If the query selection process 150 determines the same attribute type for a threshold number (or percentage) of the additional queries that specify other entities of the same type, then a parsing rule will be generated. Conversely, if the query selection process 150 does not determine the same attribute type for at least the threshold number (or percentage) of the additional queries that specify other entities of the same type, a parsing rule is not generated.

Figure 4:
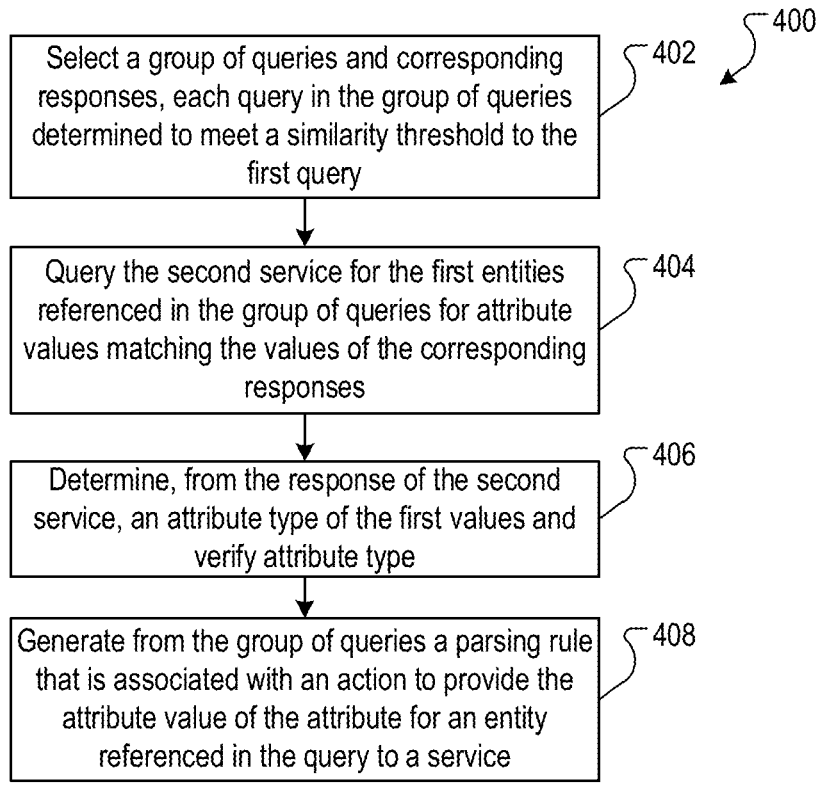
FIG. 4 is a block diagram of an example process for selecting additional queries from which a parse rule for command inputs may be induced.

FIG. 4 is a block diagram of an example process 400 selecting additional queries from which a parse rule for command inputs may be induced. The process 400 selects a group of queries and corresponding responses, each query in the group of queries determined to meet a similarity threshold to the first query (402). In some implementations, the additional queries must describe entities of the same type as the first query to be considered for inclusion in the group of queries. In the example above, the first query specified the entity "Ima Star", which is a person entity type. Accordingly, each additional query must specify a person type entity.

Additionally, in some implementations, the remaining query text must meet a similarity threshold. The similarity threshold can be semantically based, textually based, or based on some other similarity metric derived from the queries themselves or from the queries and data related to the queries. For example, in the case of semantic similarity, each of the selected additional queries has a same semantic yield as the first query. To illustrate, for the first query [How tall is Ima Starr], the query structure is:

How tall is <Person_Entity>

Other queries that specify a height request for a <Person_Entity> are thus included in the group. Accordingly, queries such as [How tall is Hesa Starr], [What is the height of Ima Starr], [What is Ima Starr's height] are included in the group.

In the case of textual similarity, each of the selected additional queries must have sufficient similarity of non-entity defining terms. The sufficient similarity can be an exact match of terms, or a match of substantially similar terms. For example, for an exact match of terms, the following two queries match:

[How tall is Ima Starr]
[How tall is Hesa Starr]

This is because both queries reduce to the form [How tall is <Person_Entity>], and thus both queries match exactly. Conversely, the following two queries would not match:

[How tall is Ima Starr]
[What is the height of Ima Starr]

Once the additional queries are selected for the group, the process 400 queries the second service for the first entities referenced in the group of queries for attribute values matching the values of the corresponding responses (404). For example, for each of the queries and the group, the query selection process 150 queries the second search system 140 for an attribute value for the detected entity that matches the respective first value for the query.

The process 400 determines, from the response of the second service, an attribute type of the first values (406). In some implementations, the attribute types determined must match the attribute type determined for the first query. Alternatively, at least a threshold percentage of the attribute values received must be of the attribute type of the first query. The threshold percentage is indicative of a confidence level that the attribute type determined is indeed correct, and can be set by system administrators, or may be determined based on the size of the data set being processed.

Provided the threshold presentence is met, the attribute type is verified, and then the process 400 generates from the group of queries a parsing rule that is associated with an action to provide the attribute value of the attribute type for an entity referenced in the query to a service (408). Generation of a parsing rule is described in more detail below.

Figure 5:
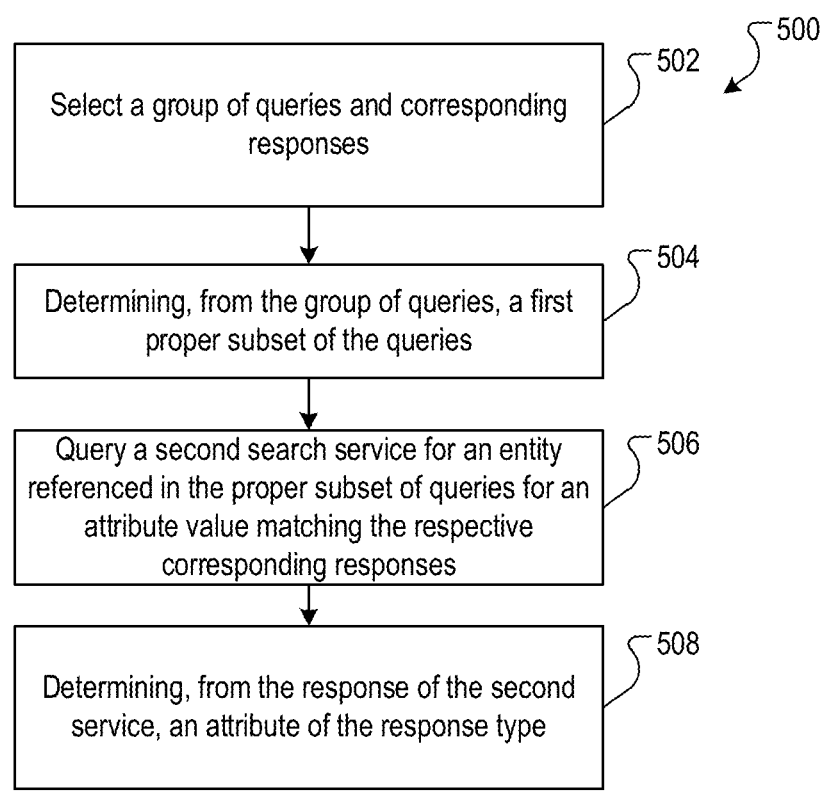
FIG. 5 is a block diagram of another example process for selecting queries from which a parse rule for a command input may be induced.

The example processes 300 and 400 above are described in the context of selecting a first query, and then selecting additional queries based on the results obtained for the first query. In another implementation, queries may be grouped based on clustering or similarity analysis, and then each of the groups may be processed to determine whether queries from the group should be used to generate parsing rules. One example process for this implementation is described with reference to FIG. 5, which is a block diagram of another example process 500 for selecting queries from which a parse rule for a command input may be induced.

The process 500 selects a group of queries and corresponding responses (502). The queries in the group are queries that have been submitted to a first search system 110 having a first recall and a first precision. Each query in the group of queries references an entity of a first entity type and meets a similarity threshold that measure a similarity of the query to other queries in the group. For example, one group of queries could be queries that reference person entities, and the queries have similar text, e.g.:

[What is the height of Ima Starr]
[How tall is Ima Starr]
[How tall is Hesa Starr]
[How big is Ima Starr]

As described above, a variety of semantic and/or similarity detection processes can be used to determine the group of similar queries. As described above, the threshold similarity may be semantically based, textually based, etc.

The process 500 determines, from the group queries, a first proper subset of the queries (504). To select the first proper subset, the query selection process 150 determines that each query references, for example, a same first entity of the first entity type and each corresponding response for the query must be of a first response type, e.g., a respective value. For example, the group of queries with the largest number of matching corresponding responses is selected as the first proper subset of queries. The aggregation of the queries by their corresponding responses tends to select well-formed queries that express an intent of the user, and filters out poor performing queries that have "noisy" results. The filtered queries are typically queries that poorly express the user's informational need.

For example, for the queries above [What is the height of Ima Starr] and [How tall is Ima Starr] are included in the proper subset, while the query [How big is Ima Starr] is not. This is because, for example, the first two queries return a same value—5' 7", while the third query does not return the value 5' 7". Thus, even though the textual and semantic content of the three queries are similar, the third query [How big is Ima Starr] results in substantially different responses from the first search system 110.

The process 500 queries a second search system for the first entity referenced in the proper subset of queries for an attribute value matching the respective corresponding responses (506). For example, as described above, the query selection process 150 queries the second search system 140 for each query in the proper subset for an attribute type of the first entity having a matching attribute value.

The process 500 determines, from the response of the second system, an attribute type of the response type (508). For example, the query selection process 150 determines that the attribute type is "height" from the responses.

In some implementations, a parsing rule can then be generated based on the queries in the proper subset. In other implementations, the attribute value may be validated by verifying the attribute value for additional proper subsets. For example, the process 300 selecting second queries from the group of queries, each referencing a second entity of the first type and different from the first entity and having a corresponding response of the first response type. Continuing with the example above, queries for a person's height for other persons would be grouped, e.g.:

[What is the height of Hesa Starr]
[How tall is Hesa Starr]
[Give me the height of Hesa Starr]

The second system is then queried for the second entities for an attribute value matching the corresponding responses, and, based on the response the attribute type is validated or not validated. For example, if responses for a threshold number of groups or a threshold percentage of response return a "height" attribute, then the attribute type is validated.

Once validated a parsing rule will be generated from the first proper subset of queries and, optionally or in addition, from the other proper subsets of queries. The parsing rule is associated with an action to provide the attribute value of the attribute for an entity referenced in the query and a successful parse of a query causes the second system to perform the action.

The parsing rules, in some implementations, can be manually generated by system administrators. In other implementations, a command model generator 130 can be a machine learned process or manually tuned process that generates parsing rules. The command model generator 130 can utilize a set of machine learned processes, each tuned for a particular operation. The command model generator 130 generates a first non-terminal corresponding to an entity type of the entities referenced in the queries, and generates one or more terminals and non-terminals corresponding to other terms in the query from terms that do not specify the entities.

For example, a grammar generated for the queries above is of the form:

S→<Terms1><PERSON>

The non-terminals <Terms1> are non-terminals that consume the text occurring before the <PERSON> non-terminal. The resulting grammar is thus:

T={How, tall, is, what, height, of, give, me, the}
N={PERSON}
S=S
R={
S→<Terms1><PERSON>
} Q: [Height:PERSON]

The grammar is associated with an action Q[Height: PERSON] that causes a query to be submitted to the second search system for the height of the person entity upon a successful parse of a query.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, the method comprising:
   receiving a first query provided to a first search service having a first recall and a first precision and a response from the first search service to the query, wherein the first query references a first entity of a first entity type;
   determining a first value specified in the response from the first search service;
   generating a query for a particular attribute value of the first entity, wherein the query is generated using the first value specified in the response from the first search service and using the first entity referenced in the first query;
   querying a second search service using the query for the particular attribute value of the first entity to identify the particular attribute value of the first entity that matches the first value in the response from the first search service, wherein the particular attribute value is for one of a plurality of attributes that is descriptive of the first entity and that corresponds to an attribute of the first entity, the second search service is distinct from the first search service and has a second recall less than the first recall and a second precision greater than the first precision;
   receiving a response from the second search service, and that specifies the particular attribute value that corresponds to the attribute of the first entity;
   determining, based on the particular attribute value specified in the response from the second search service that matches the first value, an attribute type of the first value, the attribute type corresponding to the attribute value of the first entity; and
   generating, based on the determined attribute type and at least the first query, a parsing rule that parses one or more queries, the parsing rule being associated with an action to provide the particular attribute value of the attribute for an entity referenced in at least the first query.

2. The computer-implemented method of claim 1, further comprising:
   selecting a group of queries and corresponding responses, each query in the group of queries determined to meet a similarity threshold to the first query and referencing an entity of a first entity type, and each corresponding response for a query in the group being value of a same value type and having been served by the first search service;
   querying the second search service for the first entities referenced in the group of queries for attribute values matching the values of the corresponding responses; and
   determining, from the response of the second search service, an attribute type of the first values.

3. The computer implemented method of claim 2, wherein the queries are generated from voice command inputs.

4. The computer implemented method of claim 2, wherein the parsing rule is a grammar rule.

5. The computer-implemented method of claim 2, wherein generating the parsing rule comprises:
   generating a first non-terminal corresponding to an entity type of the entities referenced in the queries; and
   generating one or more terminals and non-terminals corresponding to other terms in the query from terms that do not specify the entities.

6. A computer-implemented method, comprising:
   selecting a group of queries and corresponding responses, each corresponding response specifying respective first values and having been served by a first search service having a first recall and a first precision, and each query in the group of queries referencing an entity of a first entity type and that meet a similarity threshold that measure a similarity of the query to other queries in the group;
   determining, from the queries, a first proper subset of the queries, each query in the first proper subset of queries referencing a first entity of the first entity type and each corresponding response for the query being a first response type;
   generating a query for a particular attribute value of the first entity, wherein the query is generated using at least one respective first value specified in at least one response served by the first search service and using the first entity referenced by each query in the first proper subset of queries;

querying a second search service using the generated query to identify the first entity referenced in the first proper subset of queries and for the particular attribute value matching respective first values specified by the corresponding responses, wherein the particular attribute value is for one of a plurality of attributes that is descriptive of the first entity and that corresponds to an attribute of the first entity, the second search service is distinct from the first search service and has a second recall less than the first recall and a second precision greater than the first precision;

determining, from a response of the second search service, an attribute of the response type, the attribute of the response type corresponding to the attribute of the first entity; and generating, based on the determined attribute of the response type and at least the first proper subset of queries, a parsing rule that parses one or more queries, the parsing rule being associated with an action to provide the particular attribute value of the attribute for the entity referenced in at least the selected group of queries.

7. The computer-implemented method of claim 6, wherein determining the first proper subset of the queries comprise:
   selecting queries that each reference the same entity and that meet threshold similarity to each other;
   grouping the queries by matching corresponding responses; and
   selecting the group of queries with the largest number of matching corresponding responses as the first proper subset of queries.

8. The computer-implemented method of claim 7, further comprising:
   selecting second queries from the group of queries, each second query referencing a second entity of the first type and different from the first entity and having a corresponding response of the first response type;
   querying the second search service for the second entities for an attribute value matching the corresponding responses; and
   validating the attribute of the response types from the responses received from the second search service.

9. The computer implemented method of claim 8, wherein the queries are generated from voice command inputs.

10. The computer implemented method of claim 8, wherein the parsing rule is a grammar rule.

11. The computer-implemented method of claim 8, wherein generating, from the first proper subset of queries and the second queries, the parsing rule comprises:
   generating a first non-terminal corresponding to an entity type of the entities referenced in the queries; and
   generating one or more terminals and non-terminals corresponding to other terms in the query from terms that do not specify the entities.

12. A non-transitory computer readable storage medium storing instructions executable by a data processing apparatus and that upon such execution causes the data processing apparatus to perform operations comprising:
   receiving a first query provided to a first search service having a first recall and a first precision and a response from the first search service to the query, wherein the first query references a first entity of a first entity type;
   determining a first value specified in the response from the first search service;
   generating a query for a particular attribute value of the first entity, wherein the query is generated using the first value specified in the response from the first search service and using the first entity referenced in the first query;
   querying a second search service using the query for the particular attribute value of the first entity to identify the particular attribute value of the first entity that matches the first value in the response from the first search service, and wherein the particular attribute value is for one of a plurality of attributes that is descriptive of the first entity and that corresponds to an attribute of the first entity, the second search service is distinct from the first search service and has a second recall less than the first recall and a second precision greater than the first precision;
   receiving a response from the second search service, and that specifies the particular attribute value that corresponds to the attribute of the first entity;
   determining, based on the particular attribute value specified in the response from the second search service, an attribute type of the first value, the attribute type corresponding to the attribute value of the first entity; and
   generating, based on the determined attribute type and at least the first query, a parsing rule that parses one or more queries, the parsing rule being associated with an action to provide the particular attribute value of the attribute for an entity referenced in at least the first query.

13. A system, comprising:
   a data processing apparatus; and
   a non-transitory computer readable storage medium in data communication with the data processing apparatus storing instructions executable by the data processing apparatus and that upon such execution causes the data processing apparatus to perform operations comprising:
   receiving a first query provided to a first search service having a first recall and a first precision and a response from the first search service to the query, wherein the first query references a first entity of a first entity type;
   determining a first value specified in the response from the first search service;
   generating a query for a particular attribute value of the first entity, wherein the query is generated using the first value specified in the response from the first search service and using the first entity referenced in the first query;
   querying a second search service using the query for the particular attribute value of the first entity to identify the particular attribute value of the first entity that matches the first value in the response from the first search service, wherein the particular attribute value is for one of a plurality of attributes that is descriptive of the first entity and that corresponds to an attribute of the first entity, the second search service is distinct from the first search service and has a second recall less than the first recall and a second precision greater than the first precision;
   receiving a response from the second search service, and that specifies the particular attribute value that corresponds to the attribute of the first entity;
   determining, based on the particular attribute value specified in the response from the second search service, an attribute type of the first value, the attribute type corresponding to the attribute value of the first entity; and generating, based on the determined attribute type and at least the first query, a parsing rule that parses one or more queries, the parsing rule being associated with an action to provide the particular attribute value of the attribute for an entity referenced in at least the first query.

14. A non-transitory computer readable storage medium storing instructions executable by a data processing apparatus and that upon such execution causes the data processing apparatus to perform operations comprising:

selecting a group of queries and corresponding responses, each corresponding response specifying respective first values and having been served by a first search service having a first recall and a first precision, and each query in the group of queries referencing an entity of a first entity type and that meet a similarity threshold that measure a similarity of the query to other queries in the group;

determining, from the queries, a first proper subset of the queries, each query in the first proper subset of queries referencing a first entity of the first entity type and each corresponding response for the query being a first response type;

generating a query for a particular attribute value of the first entity, wherein the query is generated using at least one respective first value specified in at least one response served by the first search service and using the first entity referenced by each query in the first proper subset of queries;

querying a second search service using the generated query to identify the first entity referenced in the first proper subset of queries and for the particular attribute value matching respective first values specified by the corresponding responses, wherein the particular attribute value is for one of a plurality of attributes that is descriptive of the first entity and that corresponds to an attribute of the first entity, the second search service is distinct from the first search service and has a second recall less than the first recall and a second precision greater than the first precision;

determining, from a response of the second search service, an attribute of the response type, the attribute of the response type corresponding to the attribute of the first entity; and generating, based on the determined attribute of the response type and at least the first proper subset of queries, a parsing rule that parses one or more queries, the parsing rule being associated with an action to provide the particular attribute value of the attribute for the entity referenced in at least the selected group of queries.

15. A system, comprising:

a data processing apparatus; and a non-transitory computer readable storage medium in data communication with the data processing apparatus storing instructions executable by the data processing apparatus and that upon such execution causes the data processing apparatus to perform operations comprising:

selecting a group of queries and corresponding responses, each corresponding response specifying respective first values and having been served by a first search service having a first recall and a first precision, and each query in the group of queries referencing an entity of a first entity type and that meet a similarity threshold that measure a similarity of the query to other queries in the group;

determining, from the queries, a first proper subset of the queries, each query in the first proper subset of queries referencing a first entity of the first entity type and each corresponding response for the query being a first response type;

generating a query for a particular attribute value of the first entity, wherein the query is generated using at least one respective first value specified in at least one response served by the first search service and using the first entity referenced by each query in the first proper subset of queries;

querying a second search service using the generated query to identify the first entity referenced in the first proper subset of queries and for the particular attribute value matching respective first values specified by the corresponding responses, wherein the particular attribute value is for one of a plurality of attributes that is descriptive of the first entity and that corresponds to an attribute of the first entity, the second search service is distinct from the first search service and has a second recall less than the first recall and a second precision greater than the first precision;

determining, from a response of the second search service, an attribute of the response type, the attribute of the response type corresponding to the attribute of the first entity; and generating, based on the determined attribute of the response type and at least the first proper subset of queries, a parsing rule that parses one or more queries, the parsing rule being associated with an action to provide the particular attribute value of the attribute for the entity referenced in at least the selected group of queries.

* * * * *